US011711381B2

(12) United States Patent
Muthuswamy et al.

(10) Patent No.: US 11,711,381 B2
(45) Date of Patent: Jul. 25, 2023

(54) AUTOMATIC HOTSPOT IDENTIFICATION IN NETWORK GRAPHS

(71) Applicant: International Business Machines Corporation, Armonk, NY (US)

(72) Inventors: Srinivasan S. Muthuswamy, Bangalore (IN); Subhendu Das, Chapel Hill, NC (US); Mukesh Kumar, Bangalore (IN); Yi-Hui Ma, Mechanicsburg, PA (US)

(73) Assignee: International Business Machines Corporation, Armonk, NY (US)

( * ) Notice: Subject to any disclaimer, the term of this patent is extended or adjusted under 35 U.S.C. 154(b) by 391 days.

(21) Appl. No.: 17/083,474

(22) Filed: Oct. 29, 2020

(65) Prior Publication Data

US 2022/0141235 A1     May 5, 2022

(51) Int. Cl.
*H04L 9/40* (2022.01)
*G06Q 40/08* (2012.01)
*G06Q 30/018* (2023.01)

(52) U.S. Cl.
CPC ..... *H04L 63/1416* (2013.01); *G06Q 30/0185* (2013.01); *G06Q 40/08* (2013.01)

(58) Field of Classification Search
USPC .......................................................... 726/23
See application file for complete search history.

(56) References Cited

U.S. PATENT DOCUMENTS

| | | |
|---|---|---|
| 5,796,942 A | 8/1998 | Esbensen et al. |
| 6,088,804 A | 7/2000 | Hill et al. |
| 7,424,744 B1 * | 9/2008 | Wu ..................... H04L 63/0263 713/153 |
| 7,644,365 B2 | 1/2010 | Bhattacharya |
| 8,245,302 B2 | 8/2012 | Evans et al. |

(Continued)

FOREIGN PATENT DOCUMENTS

| | | |
|---|---|---|
| CN | 104867055 A1 | 8/2015 |
| EP | 3069495 B1 | 8/2019 |
| WO | 2018160906 A1 | 9/2018 |

OTHER PUBLICATIONS

Bailis et al., "Bolt-on causal consistency," Proceedings of the 2013 ACM SIGMOD International Conference on Management of Data (2013), 12 pages.

(Continued)

*Primary Examiner* — Badri Narayanan
(74) *Attorney, Agent, or Firm* — Daniel M. Yeates (57) ABSTRACT

A computer-implemented method to automatically identify hotspots in a network graph. The method includes receiving, by a processor, input data, wherein the input data includes a plurality of messages, each message containing a set of message data. The method further includes generating, by a pattern detector, and based on the input data, a network graph, wherein the network graph includes a plurality of nodes. The method also includes determining a first risk indicator for each of the plurality of nodes. The method includes assigning a first weight to the first risk indicator for each of the plurality of nodes. The method further includes identifying a first hotspot in the plurality of nodes, wherein the first hotspot is based on the first weight of the first risk indicator of a first node. The method also includes outputting, by a network interface, the first hotspot and the network graph.

19 Claims, 6 Drawing Sheets

(56) References Cited

U.S. PATENT DOCUMENTS

| | | | |
|---|---|---|---|
| 8,762,298 B1* | 6/2014 | Ranjan | G06F 21/552 |
| | | | 706/12 |
| 9,210,185 B1* | 12/2015 | Pinney Wood | G06F 21/577 |
| 9,251,183 B2 | 2/2016 | Mandelstein | |
| 9,294,497 B1* | 3/2016 | Ben-Or | H04L 63/1433 |
| 9,705,913 B2* | 7/2017 | Mirashrafi | H04W 48/20 |
| 10,848,499 B2* | 11/2020 | Badawy | H04L 63/20 |
| 11,201,890 B1* | 12/2021 | Coull | H04L 63/1416 |
| 2002/0087882 A1 | 7/2002 | Schneier et al. | |
| 2003/0145079 A1 | 7/2003 | Breese et al. | |
| 2003/0217283 A1 | 11/2003 | Hrastar et al. | |
| 2005/0278542 A1 | 12/2005 | Pierson | |
| 2012/0259753 A1 | 10/2012 | Orad et al. | |
| 2017/0331851 A1* | 11/2017 | Pinney Wood | G06F 21/577 |
| 2018/0113771 A1 | 4/2018 | Bourbonnais | |
| 2018/0285797 A1* | 10/2018 | Hu | G06Q 10/0635 |
| 2018/0367548 A1* | 12/2018 | Stokes, III | H04L 63/1416 |
| 2019/0149994 A1* | 5/2019 | Van Antwerp | H04W 12/08 |
| | | | 726/4 |
| 2020/0137104 A1* | 4/2020 | Hassanzadeh | H04L 63/1433 |
| 2020/0177616 A1* | 6/2020 | Hadar | H04L 63/1433 |

OTHER PUBLICATIONS

Braga et al., "Identification of framework hot spots using pattern languages." 15th Brazilian Symposium on Software Engineering. 2001, 16 pages.

Estivill-Castro et al., "Data mining techniques for autonomous exploration of large volumes of geo-referenced crime data." Proc. of the 6th International Conference on Geocomputation, 2001, 12 pages.

Sitanggang et al., "K-means clustering visualization of web-based OLAP operations for hotspot data." 2010 International Symposium on Information Technology. vol. 1. IEEE, 2010, 4 pages.

Weber et al. "Scalable Graph Learning for Anti-Money Laundering: A First Look." arXiv preprint arXiv:1812.00076 (2018), 7 pages.

Muthuswamy et al., "Incorporating Feedback in Network Graph Hotspot Identification", U.S. Appl. No. 17/008,742, filed Sep. 1, 2020.

Muthuswamy et al., "System and Method to Detect and Define Activity and Patterns on a Large Relationship Data Network", U.S. Appl. No. 16/824,932, filed Mar. 20, 2020.

* cited by examiner

AUTOMATIC HOTSPOT IDENTIFICATION IN NETWORK GRAPHS

BACKGROUND

The present disclosure relates to network graphs, and, more specifically, automatically identifying a hotspot in a network graph.

There is a need for monitoring transactions and activity of account holders at institutions to detect any fraudulent or criminal activity. Detecting activity indicative of fraudulent or criminal activity is increasingly difficult due to the involvement of a large amount of information, such as multiple transactions, large numbers of parties, and ease of performing the transactions.

SUMMARY

Disclosed is a computer-implemented method to automatically identify hotspots in a network graph. The method includes receiving, by a processor, input data, wherein the input data includes a plurality of messages, each message containing a set of message data. The method further includes generating, by a pattern detector, and based on the input data, a network graph, wherein the network graph includes a plurality of nodes. The method also includes determining a first risk indicator for each of the plurality of nodes. The method includes assigning a first weight to the first risk indicator for each of the plurality of nodes. The method further includes identifying a first hotspot in the plurality of nodes, wherein the first hotspot is based on the first weight of the first risk indicator of a first node. The method also includes outputting, by a network interface, the first hotspot and the network graph. Further aspects of the present disclosure are directed to systems and computer program products containing functionality consistent with the method described above.

Further aspects of the present disclosure are directed to systems and computer program products containing functionality consistent with the method described above.

The present Summary is not intended to illustrate each aspect of, every implementation of, and/or every embodiment of the present disclosure.

BRIEF DESCRIPTION OF THE DRAWINGS

Various embodiments are described herein with reference to different subject-matter. In particular, some embodiments may be described with reference to methods, whereas other embodiments may be described with reference to apparatuses and systems. However, a person skilled in the art will gather from the above and the following description that, unless otherwise notified, in addition to any combination of features belonging to one type of subject-matter, also any combination between features relating to different subject-matter, in particular, between features of the methods, and features of the apparatuses and systems, are considered as to be disclosed within this document.

The aspects defined above, and further aspects disclosed herein, are apparent from the examples of one or more embodiments to be described hereinafter and are explained with reference to the examples of the one or more embodiments, but to which the invention is not limited. Various embodiments are described, by way of example only, and with reference to the following drawings.

DETAILED DESCRIPTION

Data Processing System in General

Figure 1:
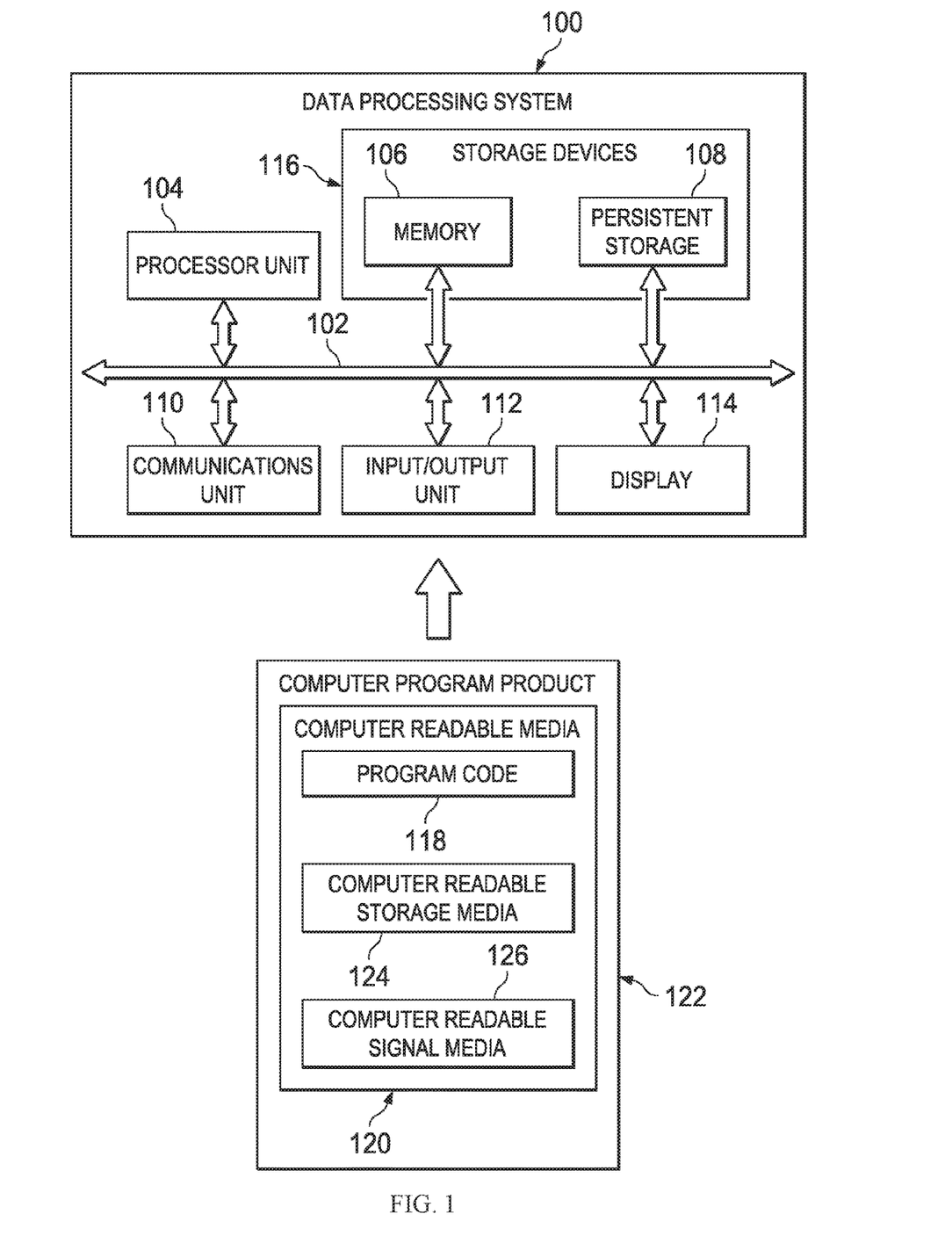
FIG. 1 is a block diagram of a DPS according to one or more embodiments disclosed herein.

FIG. 1 is a block diagram of an example data processing system (DPS) according to one or more embodiments. In this illustrative example, the DPS 100 may include communications bus 102, which may provide communications between a processor unit 104, a memory 106, persistent storage 108, a communications unit 110, an I/O unit 112, and a display 114.

The processor unit 104 serves to execute instructions for software that may be loaded into the memory 106. The processor unit 104 may be a number of processors, a multi-core processor, or some other type of processor, depending on the particular implementation. A number, as used herein with reference to an item, means one or more items. Further, the processor unit 104 may be implemented using a number of heterogeneous processor systems in which a main processor is present with secondary processors on a single chip. As another illustrative example, the processor unit 104 may be a symmetric multi-processor system containing multiple processors of the same type.

The memory 106 and persistent storage 108 are examples of storage devices 116. A storage device may be any piece of hardware that is capable of storing information, such as, for example without limitation, data, program code in functional form, and/or other suitable information either on a temporary basis and/or a permanent basis. The memory 106, in these examples, may be, for example, a random access memory or any other suitable volatile or non-volatile storage device. The persistent storage 108 may take various forms depending on the particular implementation.

For example, the persistent storage 108 may contain one or more components or devices. For example, the persistent storage 108 may be a hard drive, a flash memory, a rewritable optical disk, a rewritable magnetic tape, or some combination of the above. The media used by the persistent storage 108 also may be removable. For example, a removable hard drive may be used for the persistent storage 108.

The communications unit 110 in these examples may provide for communications with other DPSs or devices. In these examples, the communications unit 110 is a network interface card. The communications unit 110 may provide communications through the use of either or both physical and wireless communications links.

The input/output unit 112 may allow for input and output of data with other devices that may be connected to the DPS 100. For example, the input/output unit 112 may provide a connection for user input through a keyboard, a mouse, and/or some other suitable input device. Further, the input/ output unit 112 may send output to a printer. The display 114 may provide a mechanism to display information to a user.

Instructions for the operating system, applications and/or programs may be located in the storage devices 116, which are in communication with the processor unit 104 through the communications bus 102. In these illustrative examples, the instructions are in a functional form on the persistent storage 108. These instructions may be loaded into the memory 106 for execution by the processor unit 104. The processes of the different embodiments may be performed by the processor unit 104 using computer implemented instructions, which may be located in a memory, such as the memory 106.

These instructions are referred to as program code, computer usable program code, or computer readable program code that may be read and executed by a processor in the processor unit 104. The program code in the different embodiments may be embodied on different physical or tangible computer readable media, such as the memory 106 or the persistent storage 108.

The program code 118 may be located in a functional form on the computer readable media 120 that is selectively removable and may be loaded onto or transferred to the DPS 100 for execution by the processor unit 104. The program code 118 and computer readable media 120 may form a computer program product 122 in these examples. In one example, the computer readable media 120 may be computer readable storage media 124 or computer readable signal media 126. Computer readable storage media 124 may include, for example, an optical or magnetic disk that is inserted or placed into a drive or other device that is part of the persistent storage 108 for transfer onto a storage device, such as a hard drive, that is part of the persistent storage 108. The computer readable storage media 124 also may take the form of a persistent storage, such as a hard drive, a thumb drive, or a flash memory, that is connected to the DPS 100. In some instances, the computer readable storage media 124 may not be removable from the DPS 100.

Alternatively, the program code 118 may be transferred to the DPS 100 using the computer readable signal media 126. The computer readable signal media 126 may be, for example, a propagated data signal containing the program code 118. For example, the computer readable signal media 126 may be an electromagnetic signal, an optical signal, and/or any other suitable type of signal. These signals may be transmitted over communications links, such as wireless communications links, optical fiber cable, coaxial cable, a wire, and/or any other suitable type of communications link. In other words, the communications link and/or the connection may be physical or wireless in the illustrative examples.

In some illustrative embodiments, the program code 118 may be downloaded over a network to the persistent storage 108 from another device or DPS through the computer readable signal media 126 for use within the DPS 100. For instance, program code stored in a computer readable storage medium in a server DPS may be downloaded over a network from the server to the DPS 100. The DPS providing the program code 118 may be a server computer, a client computer, or some other device capable of storing and transmitting the program code 118.

The different components illustrated for the DPS 100 are not meant to provide architectural limitations to the manner in which different embodiments may be implemented. The different illustrative embodiments may be implemented in a DPS including components in addition to or in place of those illustrated for the DPS 100. Other components shown in FIG. 1

There is a need for monitoring transactions and activity of account holders at various institutions to detect any improper activity, which may include any or all of fraudulent, criminal, and unauthorized activity. Detecting improper activity is increasingly difficult due to the involvement of a large amount of information, such as multiple financial transactions, large numbers of parties, and ease of performing the transactions.

The present disclosure is directed to a system and methods to automatically identify one or more hotspots in a network graph. For purposes of this disclosure, the phrases "relationship network" and "network graph" are used interchangeably. A hotspot can be any node in the network graph that is identified as suspicious (or inducing nefarious activity, problematic, etc.). For example, in a computer network, the hotspot may be identified as a security vulnerability (e.g., hacker target or source, compromised user, etc.). A hotspot can be a node on the network graph that can indicate potential fraudulent or illegal activity (e.g., employee security risk, wire fraud, insurance fraud, etc.). In the science and technology industry, (e.g., computer security, data protection, etc.) a hotspot can indicate stolen data, manipulated experimental data, etc. In the financial industry, the hotspots can indicate potential money laundering activity. And, in the insurance industry, the hotspots can indicate an improper/fraudulent insurance claim. Fraudulent activity can be any activity that is contrary to societal norms, laws, regulations, policy, and the like. Additionally, the present disclosure is directed a system and method to use a cooccurrence of two or more hotspots in a network graph to further identify and rank hotspots in the network graph.

Embodiments of the present disclosure can create a relationship network (or network graph), (e.g., a large-scale relationship network), and/or define and detect data patterns on the relationship network, (e.g., the graph). In some embodiments, the systems and methods include ingesting data, and processing the data to form a relationship network or data network comprising a plurality of nodes and the relationships between the nodes. In some embodiments, the system and method include selecting data desirous of being detected by a user, seeding a pattern detection module with a configuration and definitions for the desired data pattern for detection, running the pattern detection module to pass messages through the relationship network, and implementing an insights module to aggregate messages and generate insights. In one or more embodiments, the system and method capture data patterns and activity in a uniform manner to create a large relationship network or graph, and run message propagation techniques to detect data patterns that may be indicative of suspicious activity or behavior. The system and method, in one or more embodiments, can capture and detect different data patterns indicative of risk and/or suspicious activity, such as, for example, data theft, data tampering, guilt by association, circular money flow, mule detection, and the like.

Embodiments of the present disclosure can identify one or more hotspots on the network graph. In addition, a list of hotspot characteristics may be compiled with the hotspot. The characteristics can be specific factors that increase likelihood that a node is a potential hotspot.

In some embodiments in which the identifying of the improper activity includes identifying money laundering and other fraudulent and/or illegal activity, the system and method can include several processes working in unison. In some embodiments, the system can analyze transaction data and develop one or more network graphs, and analyze the structure/pattens of the graphs as a whole and each node independently and how each node interacts with each other node. The network graphs can show how various network nodes (e.g., accounts, account owners, persons, businesses, transactions (or group of transactions), etc.) are related. The network graph can be further analyzed to identify one or more hotspots. A hotspot can be a node (e.g., account, account holder, etc.) or a connection (e.g., one or more transactions related to two or more nodes) that can indicate potential improper activity.

In some embodiments, identifying a hotspot is based on one or more characteristics of each node and of the network graph as a whole. Each characteristic can be individually identified and weighted to identify each hotspot. Each characteristic can include one or more specific risks. For example, the risks can include behavioral risks, structural risks, and transactions risks. In various embodiments, characteristics (both network and hotspot) and risks can be considered independently and/or cumulatively.

In some embodiments, identifying hotspots is based on analyzing all or a portions of the network graph. In some embodiments, a hotpot is based on relative position of a node to different nodes (e.g., guilt by association). For example, any node within a certain number of hops of an identified node can have an increased chance of being a hotspot. The particular node can be previously or currently marked as suspicious. In some embodiments, the relative weight of the relationship decreases as the distance increases (e.g., number hops, strength of relationships, etc.). In some embodiments, the hotspot identification is based on a type of node. For example, if the network graph represents financial transaction trends, a node can represent a person. A Politically exposed person (PEP) can be more likely to represent a hotspot than a non-PEP. A PEP can be a community leader, a director of an organization, a scientist, a technology consultant, or a person that may otherwise control decision making or have influence over others. In some embodiments, the node type and the relative position can be combined into a single weighting factor.

In some embodiments, hotspot identification is based on weak ties. Weak ties represent a node that has a connection with a node in a different category. The category can be, for example, a geographic area. A first node may have several connections in a first geographic area, and a single connection to a second and a third geographic area. The connection to the different geographical area can be the weak ties.

In some embodiments, the hotspots are ranked. The ranking can be based on a page walk of the network graph or a portion of the network graph. The terms page walk and random walk can be used interchangeably. A random walk picks a node and randomly (or based on identified weights and characteristics) traverses the network graph. The path taken can be used to rank each node and subsequently identify the hotspots. In some embodiments, co-occurrence of hotspots (e.g., two hotspots with a direct connection, two or more hotspots that follow a specified pattern, etc.) may be used to rank the hotspots. In some embodiments, the system can output the identified hotspots. The output can include a rank of the hotspots.

The aforementioned advantages are example advantages, and embodiments exist that can contain all, some, or none of the aforementioned advantages while remaining within the spirit and scope of the present disclosure.

Figure 2:
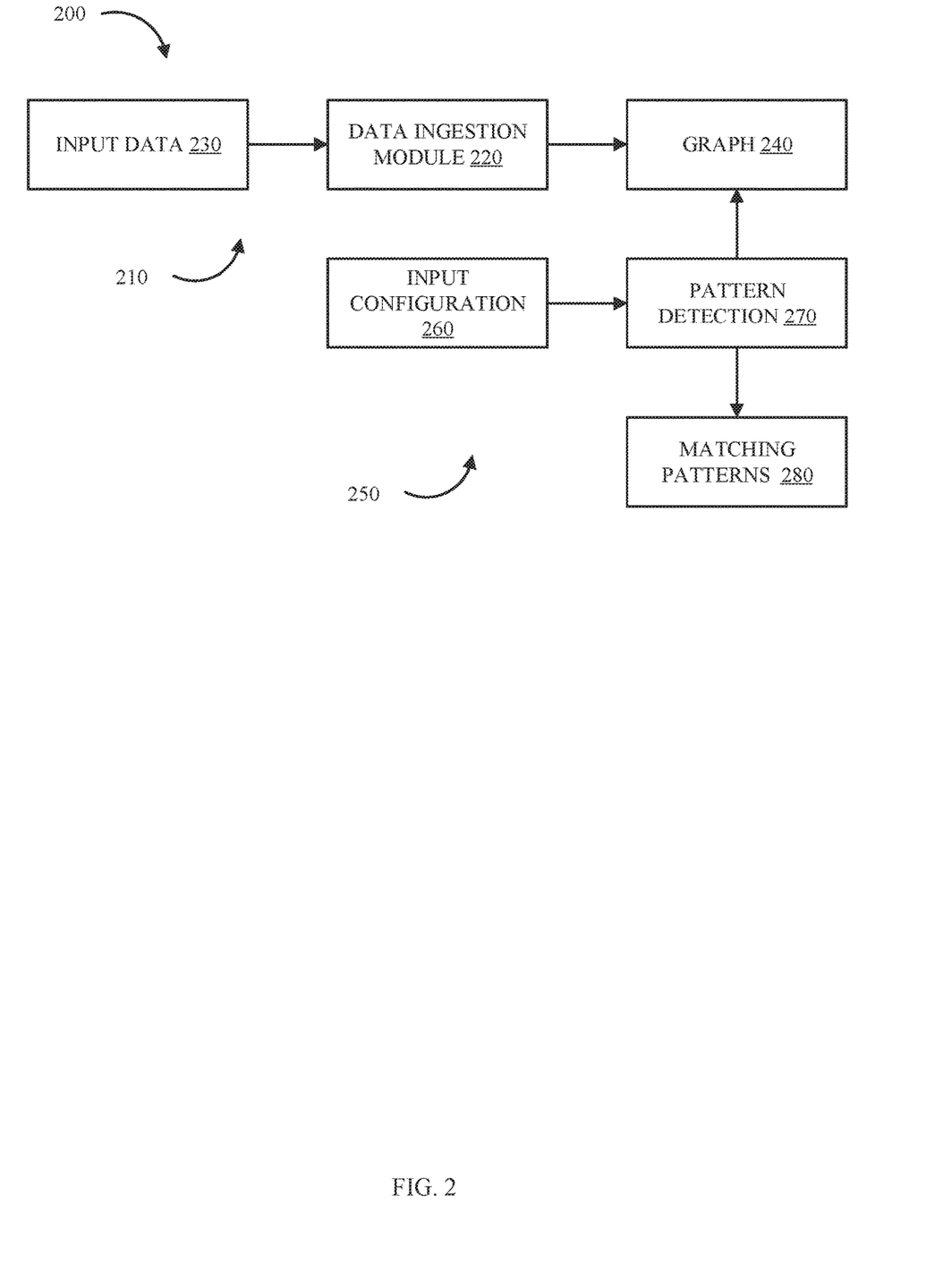
FIG. 2 depicts a block diagram of an embodiment of a system for processing data, including creating a relationship network, defining and detecting data patterns according to one or more embodiments disclosed herein.

FIG. 2 is a block diagram of an embodiment of a system and method to create a large relationship network or graph, and/or define and detect different data patterns in the relationship network, and/or collect and aggregate insights based upon the relationship network. In a first part 210 of system 200, data ingestion module 220 reads input data 230 and creates network graph 240. Network graph 240 in one or more embodiments is a large-scale relationship network, also referred to as a data network. The data ingestion module 220 includes circuitry and/or logic to receive the input data 230 and process the data to network graph 240. The system 200 is particularly adapted to define and/or detect data patterns in the relationship network indicative of suspicious activity typically associated with fraud, data theft, data manipulation, money laundering, and/or criminal activity. In one or more embodiments, the input data 230 comprises parties, accounts, transactions, etc. For example, where a financial institution, such as a bank, desires to determine if there is a money laundering scheme or other fraud, for example, as a result of governmental oversight, or regulations, such as anti-money laundering (AML) laws, the input data 230 can comprise: the transactions occurring with or being processed by the financial institution; the parties to any financial transaction with or through the financial institution; and account information (for the customers) of the financial institution. In the case of an insurance organization and the like, the input data 230 can comprise: the parties doing business with the insurance organization; the claims made with the insurance organization; policy information (for the customers) of the insurance organization, the identity of any agencies or brokers that were involved in underwriting the policy, and any parties involved in treating the claim, e.g., an auto body shop fixing a motor vehicle, a physician treating patient, etc. The examples above are not limiting and there can be other situations where the system 200 will have applications, and additional or other input data can be provided.

The input data 230 is input into the data ingestion module 220 which outputs this data as a network graph 240. The data ingestion module 220 contains circuitry and/or logic to receive input data 230 and process the data to create the network graph 240. In most instances, large amounts of data are input and processed by the data ingestion module 220, and the network graph 240 is a large-scale network graph 240. The network graph 240 includes, for example, objects and relationships. Objects, for example, can be people, accounts, policies, data stores, data gathering, etc. The transactional or network graph 240 from processing input data 230 of a financial institution would include, for example, parties, party-account relationships, account-account transactional relationships, and party-party relationships.

Referring again to FIG. 2, the second part 250 of the system 200 includes input configuration module 260, and pattern detection module 270 for matching data patterns 280. The input configuration module 260 sets up the system to detect desired data patterns indicative of activity or behavior in the transaction network. The input configuration module 260 contains circuitry and/or logic to receive the input configuration information from the user, and process and/or transmit information and data to the pattern detection module 270. A user inputs information to the system 200, and in particular, the second part 250 of the system, vis-à-vis the input configuration module 260 so that the system knows the type of data patterns indicative of suspicious activity or behavior that the system 200, and in particular, the second part 250 of the system 200, will search for and detect. That is, the user defines through the input configuration module 260 the type of data pattern 280 the system 200 should detect, and in particular, the type of pattern 280 the second part 250, more particularly the pattern detection module 270, of the system 200 should search for in the network graph

240. The pattern detection module 270 reads data from the network graph 240 and detects patterns of behavior or activity 280 in the network graph 240 as defined by the input configuration selected and input by the user. The pattern detection module 270 contains circuitry and/or logic to receive input configuration data from input configuration module 260, receive relationship network data, process the input configuration and the network graph 240 to detect data patterns, and, in one or more embodiments, create insights, including in an aspect aggregating, and applying the insights to the network graph 240.

Figure 3:
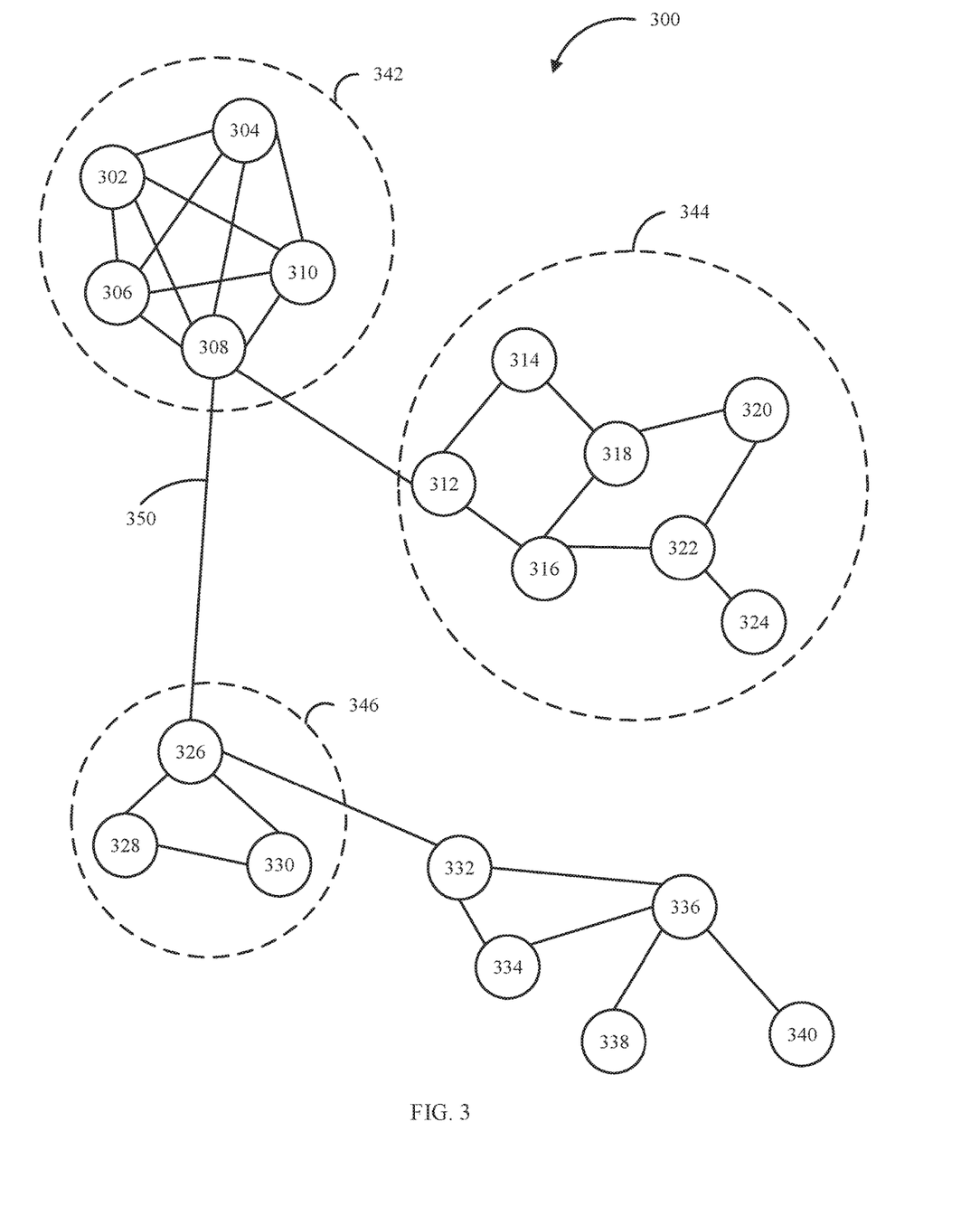
FIG. 3 is an illustration of an embodiment of a network graph according to one or more embodiments disclosed herein.

FIG. 3 illustrates an example of a full (or a portion of) a network graph 300 (e.g., produced by the data ingestion module 220). In some embodiments, the network graph is based upon input data 230 of a financial institution or an insurance institution. The network graph 240 typically will include much more data and be of a much larger scale than illustrated in FIG. 3. FIG. 3 includes a plurality of nodes, 302, 304, 306, 308, 310, 312, 314, 316, 318, 320, 322, 324, 326, 328, 330, 332, 334, 336, 338, and 340. Each node represents a unique unit. The unit can be an account, an institution, a person, an area, a computer (such as the data processing system 100), a server, a user, and the like. Network graph 300 also includes grouping 342, 344, and 346. The grouping can represent any method of correlating one or more nodes other than the relationships represented by links 350. For example, each groping can represent a geographical area, an organization (e.g., a bank, where each node is an account for the bank), a type (e.g., an account type, a type of computing device, type of insurance claim such as personal injury or property damage, etc.), and the like. Links 350 show a relationship between the nodes connected by the link. (e.g., a map of a pattern of a transaction flow, relationship between each party, etc.). In some embodiments, links 350 can indicate a direction (e.g., data flow, money flow, sender and receiver, etc.).

As an overall example for graph 300, each node can be a person, each grouping a geographic location (e.g., a state, a county, etc.), and each link represents at least one transaction between the two persons. Further, the link between node 308 and node 312, and node 308 and node 326 can represent a weak tie as previously discussed. A second example, each node can represent an insurance claim, each grouping an event (e.g., a weather event, etc.), and each link a known connection between parties (e.g., family member, close friend, co-worker, etc.). A third example, each node can represent a computing device, each grouping a firewall, and each link multi-direction message traffic. These examples are not limiting, but rather illustrating of the various situations network graph 300 can accurately represent.

Figure 4:
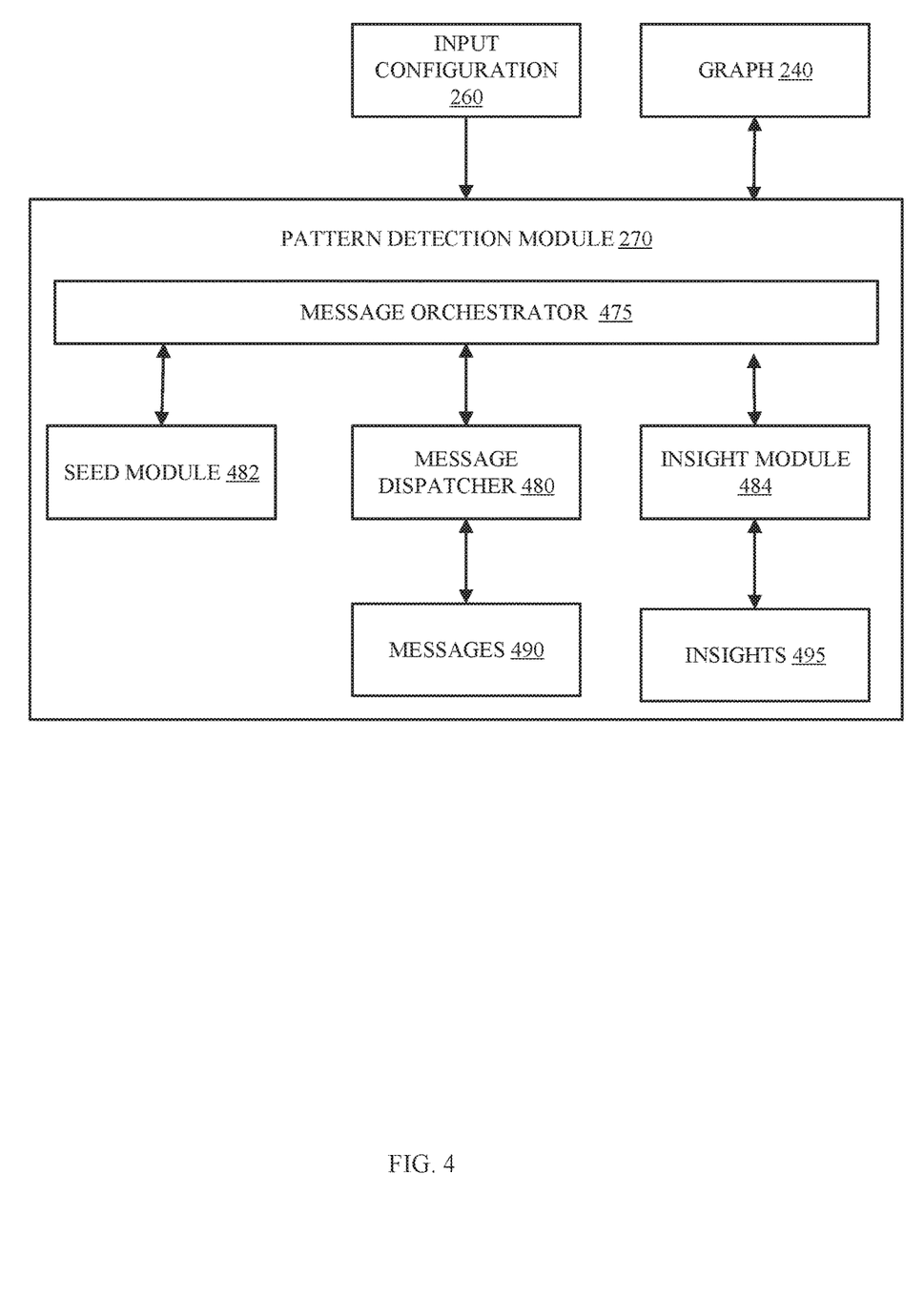
FIG. 4 depicts a block diagram of an embodiment of a pattern detection module according to one or more embodiments disclosed herein.

FIG. 4 illustrates an embodiment of pattern detection module 270. To illustrate pattern detection module 270, but not to limit embodiments, FIG. 4 is described within the context of FIG. 2. Where elements referred to in FIG. 4 can be consistent with elements shown in FIG. 2, the same reference numbers are used in both figures.

Pattern detection module 270 in one or more embodiments includes a message orchestrator 475, a seed module 482, a message dispatcher 480, and an insights module 484. Pattern detection module 270, in an aspect, also includes a message repository 490 and an insights repository 495. The message orchestrator 475 contains circuitry and/or logic to control the seed module 482, the message dispatcher 480, and the insights module 484, and to invoke the modules for detecting patterns 280 in the network graph 240. As an overview, the message orchestrator 475 receives the input configuration 260, which instructs the message orchestrator 475 on the type of data pattern 280 to detect and the criteria, filters, and/or rules to apply during data pattern detection. The message orchestrator 475 calls the seed module 482 and, in an embodiment, passes the input configuration onto, or defines the input configuration for, the seed module 482. The seed module 482 contains circuitry and/or logic to generate, initialize, or initiate the seed messages, which in an embodiment are sent to the message repository 490. After transmitting the messages to the message repository 490, seed module 482 gives control back to the message orchestrator 475. The message orchestrator 475 then involves the message dispatcher module 480 which contains circuitry and/or logic to read the messages and dispatch each message to its target receiver as defined by the criteria, filter and/or rules selected by input configuration 260. The message dispatcher module 480 propagates and dispatches all messages until there are no more messages in the message repository 490 to process. The message dispatcher module 480 also maintains the message repository 490. The message dispatcher module 480 propagates the messages by reading the network graph 240 and forwarding, saving, and/or terminating the messages according to the criteria, filters, and/or rules defined and selected by input configuration 260. The messages that meet the criteria defined by the system (based upon the input configuration) are saved by the insights module 484 as insights in the insights repository 495. The insights module 484 contains circuitry and/or logic to maintain and save the insights in the insights repository 495. The message orchestrator 475 calls the insights module 484 to aggregate the insights saved in the insights repository 495, and in one or more embodiments saves and/or applies the insights to the network graph 240. The message orchestrator 475, the seed module 482, the message dispatcher module 480, and the insights module 484 all contain circuitry and/or logic to perform their recited functions.

The seed module 482, based upon input configuration 260 received by the message orchestrator 475, generates or prepares the initial seed messages. The messages, including the initial seed messages, contain and identify information based upon the type of pattern to be detected and the criteria, filters, and/or rules selected through the input configuration 260 and implemented by the seed module 482 and the message dispatcher module 480. The information identified and/or contained in a (propagated) message, including an initial seed message can contain: original sender data/identifier; sender data/identifier; receiver data/identifier; target receiver data/identifier; date/time data; trace data; and score (other transaction data). The trace data is the path taken through the network graph 240 from the initiator or seed node (the original sender) to the receiver node. The information identified in the seed message is updated as the message is forwarded and propagated in the relationship network.

When the seed module 482 prepares the initial seed messages, the "original sender" (e.g., 340) is identified in the network graph 240 and is referred to as the initiator or seed node. The seed module 482, based upon the input configuration 260 and the network graph 240, runs a filter, such as, for example, applying the rules or criteria selected as input configuration data, to identify all the seed or initiator nodes. The seed module 482 also in one or more embodiments identifies the "sender", which, in the case of the initial messages, is the same as the "original sender". The seed module 482 also, in an embodiment, identifies the "receiver" and the "target receiver". A "sender" who is not the same as the "original sender" can have first been a "receiver" and subsequently forward the message to become a "sender" (or "additional sender"). The "receiver" is the particular node that receives the message and can be a party object or an account object. To determine the "receiver", the seed module 482, in an aspect, looks at the relationship data of the initiator or seed node from the network graph 240. The seed module 482 identifies all the nodes to which the initiator node is directly connected. The seed module 482 generates or prepares the initial messages based upon the nodes to which the initiator or seed node is directly connected. That is, in one or more embodiments, for each node that the initiator or seed node is directly connected, the seed module 482 creates one initial message. If the initiator or seed node is directly connected to four (4) nodes for example, then in an embodiment four (4) initial messages are created. The seed module 482, when creating the initial messages, identifies the initiator or seed node as the "original sender" and the directly connected node as the "receiver." The "target receiver" is the object type, e.g., a party or account node/object or any other type of object that is supposed to carry the propagated risk.

The seed module 482 also sets forth the trace or the pathway for the initial message 505. The seed module 482 also sets or assigns the weight score to be associated with the relationship between the nodes based upon the input configuration 260. That is, the weight or score is set by the user, and may be set by the type of activity being searched for in the network. These initial messages need to be sent to and/or stored in the message repository 490 so the seed module 482 involves the message dispatcher 480 to send the initial message(s) to the message repository 490 and the initial messages are sent to and stored in the message repository 490. Control is then turned back from the seed module 482 to the message orchestrator 475.

The system 200 has now been initialized with the initial seed messages generated and stored in the message repository 490, and the message orchestrator 475 has control. The message orchestrator 475 calls the message dispatcher 480 to propagate the initial messages through the network graph 240 and detect certain data patterns 280. The message dispatcher 480 looks at the message repository 490 and reads the initial message(s). The message dispatcher 480 reads the messages for a given node, and: (a) if the given object/node is the receiver node and if the reach factor (which is a measure of the degree of relationship with the initiator node) is reached, then the message is archived (stored) as an insight in the insights repository 495; (b) if the given object/node is the receiver node, but the reach factor is not reached, then the message is archived (stored) as an insight in the insights repository 495 and the message is forwarded in the network graph 240; and (c) if the given object/node is a pass-through node, then the message is forwarded in the network graph 240 and no insights are saved to the insights repository 495. In one or more embodiments, the message is forwarded to the immediate surrounding directly connected nodes as determined from the network graph 240. In an aspect, and according to the input configuration, the message(s) are not forwarded to a node that forms a loop. That is, in an embodiment, a message whose trace or pathway forms a loop where it is propagated or forwarded to the same node more than once is deemed invalid and is not undertaken or performed by the message dispatcher module 480 (or system 200). In a different aspect, and according to the input configuration, the messages are permitted to form a loop. To save insights to the insights repository 495, in one or more embodiments, the message dispatcher 480 invokes the insights module 484 to save the message to the insights repository 495. In one or more embodiments the insights can be saved on a node basis. The reach factor, also referred to as the relationship degree, is the number of receiver nodes in the pathway or trace to connect back to the initiator or seed node. The reach factor or relationship degree in one or more embodiments is programmable and variable, and can be input by a user when setting the input configuration 260 for the system 200, or more particularly the second part 250 of the system 200.

The message dispatcher module 480 fetches the first initial message or seed message from the message repository 490, and, based upon the information in the initial message: saves the initial or seed message to the insights repository 495 as described above; terminates the initial message based upon the reach factor; and/or forwards the seed message in the relationship network as a propagated message based upon the reach factor and/or whether the receiver node is a pass through node as defined in the system. For any seed or initial message that is to be forwarded as a propagated message, all the nodes directly connected to the receiver node of the seed message are identified in the network graph 240 and the seed message is forwarded to those directly connected nodes as a propagated message.

For each propagated message, if the directly connected node is: (a) within the reach factor, the propagated message is saved and is propagated in the network graph 240; (b) at the reach factor, the propagated message is saved as an insight and is not forwarded in the network graph 240 (i.e., the propagated message is terminated); and (c) a pass-through node, the propagated message is forwarded in the network graph 240. This process of determining the directly connected nodes and forwarding the propagated message in the network graph 240 is continued until the propagated message is fully propagated and forwarded and has no more valid, directly connected nodes (e.g., the propagated message is beyond the reach factor, or, in one of more embodiments, the pathway or trace of the propagated message forms a loop). As the seed messages and propagated messages are propagated through the network graph 240, the information contained in the messages in one or more aspects changes and is updated.

The message dispatcher 480 propagates the messages through the network graph 240 until each message is fully propagated (e.g., beyond the reach factor determined by the input configuration 260). The message dispatcher 480 propagates each message through the network graph 240 until no more messages are left in the system (i.e., the message repository 490). When all the messages are processed and propagated through the network graph 240, control from the message dispatcher 480 goes back to the message orchestrator 475. The message orchestrator 475 can invoke the insights module 484 to collect insights (e.g., the messages saved to the insight repository 495). In one or more embodiments, the insights module 484 looks at all the archived messages saved to each node in the insights repository 495 and generates insights for each node. In an aspect, if the aggregate function is selected, the messages saved to the insight repository 495 are aggregated by the condition (e.g., one degree of relationship difference, or two degree of relationship difference), and scores are accumulated, for example, on a node-by-node basis. In one or more embodiments, the message orchestrator 475 receives the insights, e.g., the saved messages, from the insights module 484 and adds the insights or portions thereof to the network graph 240. The insights and the manner of saving the insights can vary with the system and the pattern that is desired to be detected. The input configuration 260 in one or more aspects permits the input criteria, the insights to be collected, and how such insights will be presented and/or transmitted to the end user, to be varied.

The system will be updated with additional input data over time. For example, after a first run of the system and method, a bank, financial institution, insurance organization, researcher, experiment, computer network etc., could periodically, for example daily, monthly, bi-yearly, etc., update the system with additional data. In one or more embodiments, the system detects updates to the network graph 240 as a new object/node added, a new relationship added, an existing relationship updated, an object/node deleted, or a relationship deleted. The system in one or more embodiments will review the traces and determine which paths need to be redone, e.g., re-propagated, or where there are new paths to be traversed. The system and method, in one or more embodiments, can be updated, and, in an embodiment, a trace is used to determine one or more paths needed to recreate the message propagation in the relationship or data network to obtain updated insights based upon new updated data, or to determine any new path that needs to be traversed because of the new data. The system, when performing the update, will initiate the propagation, add updates to the archives, and re-run the insights module on the impacted nodes where updates are added to the insights repository and insights are regenerated.

Figure 5:
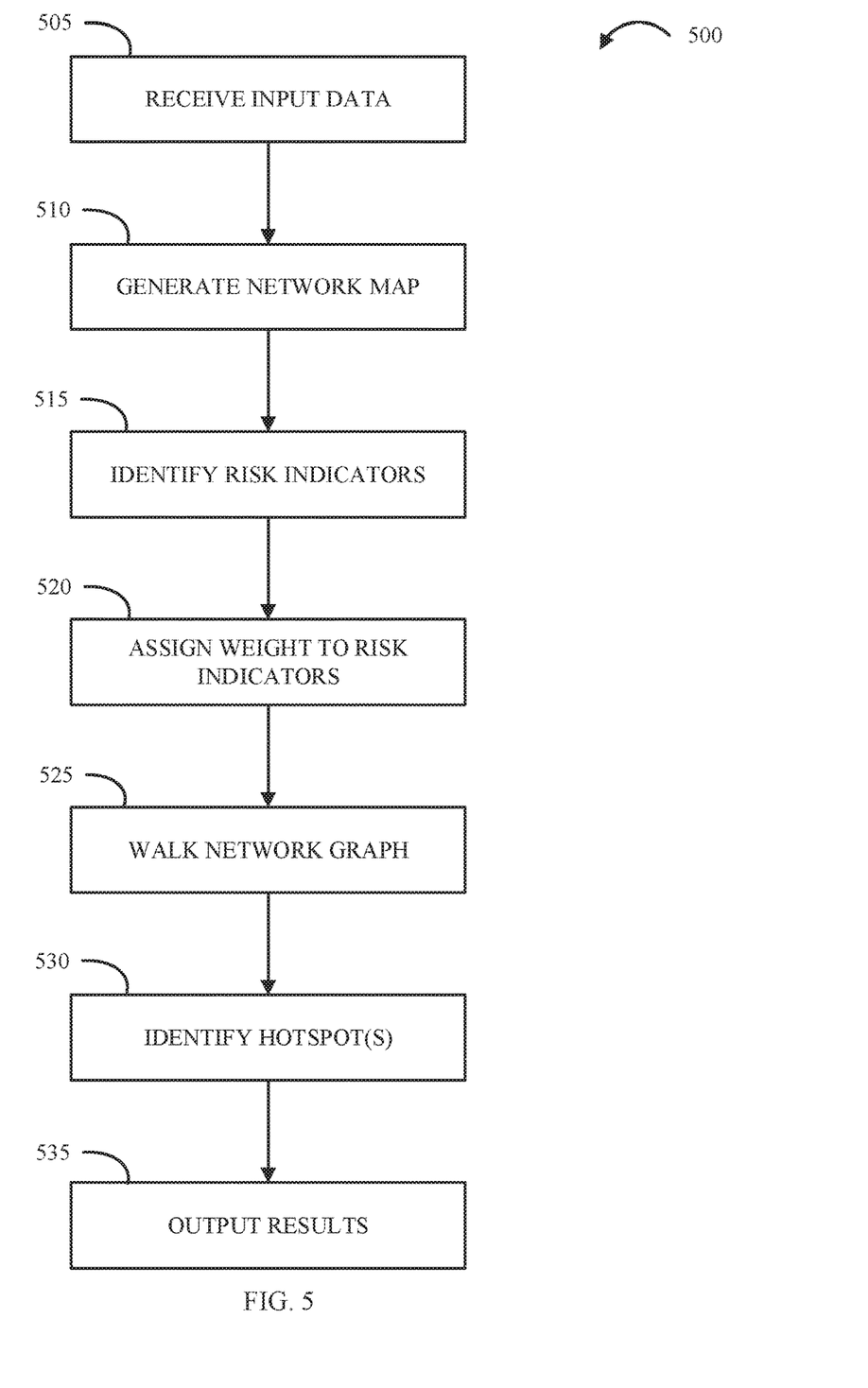
FIG. 5 illustrates a flow chart of an example method to automatically identify hotspots in a network graph according to one or more embodiments disclosed herein.

FIG. 5 is an example flowchart in accordance with at least one embodiment of the present disclosure illustrating and describing a method 500 for identifying one or more hotspots within a network graph. While the method 500 is described for the sake of convenience and not with an intent of limiting the disclosure as comprising a series and/or a number of steps, the process does not need to be performed as a series of steps and/or the steps do not need to be performed in the order shown and described with respect to FIG. 5, but the process may be integrated and/or one or more steps may be performed together, simultaneously, or the steps may be performed in the order disclosed or in an alternate order.

The method 500 includes, at 505, receiving input data. In some embodiments, the input data includes message data (or transaction data). In some embodiments, the input data is received at input data 230. The message data can include all relevant data for each message. For example, if the input data can include financial transactional information, parties to financial transactions, account numbers involved in the transactions, amounts and times of the transactions, and customers of the transactions, originating and final location of the transactions (e.g., transfers), can be included with the message. The input data can include other transactional information, such as, for example, insurance transactional information.

In some embodiments, the input data includes input configuration criteria. The configuration criteria inform the system what data patterns to detect in the relationship network and, in one or more embodiments, what criteria, filters, and/or rules to use when detecting data patterns and/or hotspots in the relationship network.

The method 500 includes, at 510, generating one or more network graphs (e.g., network graph 240, network graph 300). In some embodiments, generating the network map includes: detecting data patterns in the relationship network or graph; and/or includes, in one or more aspects, receiving a user-provided input configuration to the system. The input configuration informs the system what data patterns to detect in the relationship network and, in one or more embodiments, what criteria, filters, and/or rules to use when detecting data patterns in the relationship network. In some embodiments, the network map includes one or more nodes and connections between the nodes. Each node can represent an account, a user, an organization, or something similar. The connections can represent relationships, such as transaction between the two nodes, and/or other connections (e.g., both use a common bank).

The method 500 includes, at 515, identifying risk indicators. In some embodiments, one or more nodes, up to all nodes, are analyzed. A risk indicator can be any condition, pattern, characteristic, etc., that may indicate improper behavior for the node. In some embodiments, the risk indicators are based on one or more hotspot characteristics. In some embodiments, each node is analyzed for each risk indicator. In some embodiments, a subset of the nodes may be analyzed for any size subset of the risk indicators.

In some embodiments, the system can identify one or more characteristics of each hotspot. The characteristics can include a pseudo description of the hotspot. Some potential characteristics can include transactions moving out of or into specific monetary systems (e.g., international borders, banks, organizations, etc.), transactions involving a risky party, large sums, large deposit with subsequent wire transfers, routing patterns (e.g., loops, common destinations, etc.), and other similar factors.

In some embodiments, the risk indicators are based on input configuration. The system receives input configuration from a user, including the type of data pattern (e.g., activity) the system should detect. In one or more embodiments, the input configuration 260 sets a number of criteria and filters. The criteria can include a reach factor. The reach factor can represent how suspicious activity can affect surrounding parties (e.g., how many nodes are affected by a potential hotspot). The reach factor is set, and the criteria to terminate the message propagation are set, then the message propagation will terminate upon reaching the reach factor. The input criteria includes for one or more embodiments setting node and edge filters, trace (or pathway), cycles allowed, the path, and how insights are aggregated.

In some embodiments, the risk indicators include a behavior risk. A behavior risk can include identifying known parties and/or identifying associations with known parties, where the known parties are flagged. For behavior risk, among other input criteria, the "seed nodes" are set as a party associated with or that has been identified as having a suspicious activity report (SAR), an politically exposed person (PEP), or a party that has received sanctions; and "receivers" are set as a party; and pass-through nodes are set as accounts. A PEP is one who is entrusted with a prominent function that generally presents a higher risk for being involved in fraudulent activity.

In some embodiments, the risk indicators include a structural risk. The structural risk can include the shape/configuration of the network graph. The configuration can include how the accounts (e.g., account holders, controlling parties) are connected and/or interact (e.g., as subsidiaries, etc.). In some embodiments, one criterion includes transactional risk. The transactional risks can include amounts (e.g., unusually large amounts, amounts just under mandatory reporting limits, etc.), frequency, and/or locations (e.g., both originating and final locations). For example, if an account routes multiple chains of transactions into country A, such activity can indicate a transactional risk.

The method 500 includes, at 520, assigning a weight to each risk indicator (or indicator). In some embodiments, a weight is assigned to each of the identified risk indicators for each node. In some embodiments, the various risk indicators can be weighted in any manner. The weight can represent how likely a specific factor is likely to portray fraudulent activity. In various embodiments, guilt by association, weak ties, and community leaders can be included in the weighted factors. In some embodiments, additional method can be used to weight factors. For example, a first bank may have a specific pattern/factor that can be added into the weighting process.

The method 500 includes, at 525, performing a page walk of the network graph. In some embodiments, the page walk includes a random walk algorithm. A random walk is a random process where a random step is taken to a next node, based on mathematical calculations. In some embodiments, the page includes ranking each node. For example, a node that is accessed/traversed more times in the random walk can be ranked higher than a node that is accesses relatively less times. In some embodiments, the mathematical calculations are based on the weighted risk factors.

In some embodiments, performing the page walk includes generating an overall risk score. The risk score can be based on the results of the page walk and/or the weighing of the risk factors. For example, an overall risk score can be a number between 0 and 1, and the closer to 1, the higher the overall risk. In the network graph 240, the relations between the nodes are weighted (to represent the significance of the relation in the context of the problem). In the page rank, the system does a random walk. As the walk progresses, the risk will propagate from one node to the other node. the page walk, the network will stabilize at a new value (e.g., no more movement of risk).

The method 500 includes, at 530, identifying one or more hotspots in the network graph. In some embodiments, identifying the hotspots is based on the page walk. In some embodiments, the topmost ranked nodes can be identified as hotspots. The topmost ranked nodes can be an absolute number of nodes. Additionally, the topmost ranked nodes can be a percentage of the nodes (e.g., top 10% of nodes). The number/percentage of nodes that are considered hotspots can be updated. In some embodiments, a node is identified as a hotspot if the overall risk score exceeds a predetermined threshold (e.g., a setpoint). The predetermined threshold can be changed based on the requirements of the user.

In some embodiments, the ranking is based on co-occurrence of hotspots. A co-occurrence can be any two or more hotspots that are identified within a predetermined proximity (e.g., number of hops) on a network graph. The co-occurrence can be used to rank and/or adjust the rank from the page walk. Co-occurrence of hotspots will be further discussed in relation to FIG. 6.

The method 500 includes, at 535, outputting results. This can include displaying the identified hotspots, and other network characteristic and hotspot characteristic data. In some embodiments, the output includes displaying the network graph with the one or more hotspots indicated (e.g., highlighted) on the network graph. In some embodiments, the output can include notifying (e.g., an alarm, an email notification, etc.) the user that a hotspot has been identified.

Figure 6:
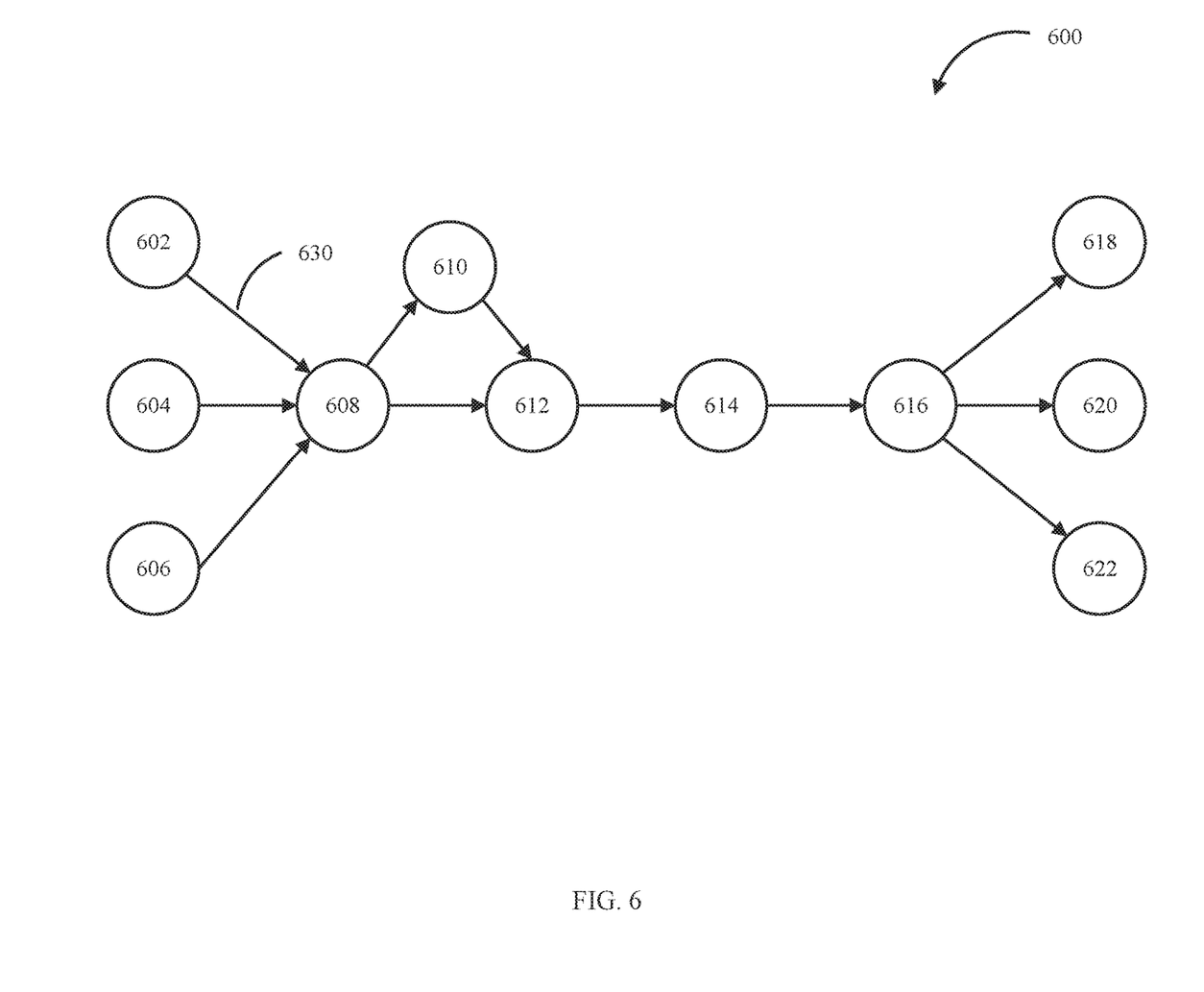
FIG. 6 is an illustration of an embodiment of a network graphs according to one or more embodiments disclosed herein.

FIG. 6 illustrates an example of a full (or a portion of) a network graph 600. In some embodiments FIG. 6 can be a portion of the network graph 300. In some embodiments, FIG. 6 can be separate from network graph 300. Network graph 600 includes a plurality of nodes 602, 604, 606, 608, 610, 612, 614, 616, 618, 620, and 622. Each node represents unique unit. The unit can be an account, an institution, a person, an area, a computer, a server, a user, and the like. Links 630 show a relationship between the nodes connected by the link (e.g., a map of a pattern of a transaction flow, relationship between each party, etc.). In embodiments, the links 630 can indicate a direction of data/transaction flow.

In some embodiments, node 610 can be a decoy node. The node is intentionally inserted into a process (e.g., money transfer flow) to obscure a suspicious pattern. A decoy node can assist in identifying hotspots. In some embodiments, node 608 can be identified as a fan-in node. A fan-in node can be any node that is a target of more than one sender. A fan-in node can be identified as a hotspot. A fan-in node's features include the aggregate amount of data (e.g., cash, data, etc.) transferred into the node, the number of sending nodes (e.g., nodes 602, 604, and 606), time period for fan-in to occur, and type of transaction/message. In some embodiments, node 616 can be a fan-out node. A fan-out node can be any node that sends messages/transactions to two or more target nodes. A fan-out node can be identified as a hotspot. A fan-out node can include the same characteristics as the fan-in node, except reversed for sending vice receiving. In some embodiments, node 614 can be a broker node. A broker node can be any node that is located in between a fan-in node and a fan-out node. The broker node can pass the message received from the fan-in node (even if not directly received from the fan-in node) and send, through any number of hops, to a fan-out node. In some embodiments, broker nodes can be identified as a hotspot.

In some embodiments, each node type, (e.g., fan-in node, fan-out node, decoy node, broker node) can be correlated with a risk factor. In some embodiments, identifying one type of node can increase the likelihood of identifying a second type of node. For example, in most cases a fan-in node and a fan-out node will be identified in a pair, and then may also include at least one broker node between them (though this is not required).

In some embodiments, identifying one node type as a hotspot increases the weighting factor of other types of nodes. For example, if a fan-in node is identified as a hot spot, then the weighting on any identified broker nodes, decoy nodes, and/or fan out nodes can be adjusted. Adjusting the weighting can increase the likelihood (e.g., move node up in ranking, increase the overall risk score, etc.) the other identified nodes will be identified as a hotspot and/or increased in rankings. In some embodiments, hotspots are identified in sets. The set can include any number of hotspots. For example, in one embodiment, a fan-in node can only be identified if a corresponding fan-out node is also identified. In a second embodiment, set can include a fan-in node, a fan-out node, and at least one broker node.

In some embodiments, identifying two or more co-occurring hotspots can increase the overall rank/overall risk score of each hotspot involved. In some embodiments, hotspots are identified only if there are two or more co-occurring hotspots.

Computer Technology and Computer Readable Media

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:
1. A computer-implemented method comprising:
receiving, by a processor, input data, wherein the input data includes a plurality of messages, each message containing a set of message data;
generating, by a pattern detector, and based on the input data, a network graph, wherein the network graph includes a plurality of nodes and each node includes a set of characteristics;
determining a first risk indicator for each of the plurality of nodes, wherein the risk indicator based on a first characteristic of the set of characteristics;
assigning a first weight to the first risk indicator for each node of the plurality of nodes, wherein the first weight represents a likelihood, for each node, for the first risk indicator to portray fraudulent activity, wherein the first weight being above a first threshold indicates the node is associated with fraudulent activity regarding the first risk indicator;

identifying at least two co-occurring hotspots, wherein the at least two co-occurring hotspots include the first hotspot and a second hotspot, and the first hotspot is based on the first weight of the first risk indicator of a first node; and outputting, by a network interface, the first hotspot and the network graph, wherein the outputting includes displaying the network graph including highlighting the first hotspot.

2. The method of claim 1, wherein the identifying of the first hotspot further comprises:

performing a page walk of the network graph.

3. The method of claim 2, wherein the identifying of the first hotspot further comprises:

ranking, based on the page walk, each node of the plurality of nodes including ranking the first hotspot.

4. The method of claim 3, wherein the identifying of the first hotspot is based on the ranking of the first hotspot being a topmost ranked node.

5. The method of claim 1, further comprising:

determining a second risk indicator and a third risk indicator for each node of the plurality of nodes.

6. The method of claim 5, wherein the first risk indicator is based on weak ties of each node, the second risk indicator is based on guilt by association, and the third risk indicator is based on community leaders.

7. The method of claim 5, further comprising:

generating, for each node of the plurality of nodes, an overall risk score based on the first risk indicator, the second risk indicator, and the third risk indicator, wherein the identifying of the first hotspot is based on the overall risk score of the first hotspot being greater than a predetermined threshold.

8. The method of claim 1, wherein the identifying of the first hotspot is based on the first weight of the first risk indicator being greater than the first threshold.

9. The method of claim 1, wherein the first hotspot is a fan-in node and the second hotspot is a fan-out node.

10. The method of claim 9, wherein the at least two co-occurring hotspots includes a third hotspot and the third hotspot is a broker node.

11. The method of claim 1 wherein each message includes a financial transaction.

12. The method of claim 1, wherein each message includes an insurance claim.

13. The method of claim 1, wherein a first message is sent from a first geographical area to a second geographical area.

14. A system comprising: a processor, a memory; and a tangible computer-readable storage medium communicatively coupled to the processor and storing program instructions which is executed by the processor, are configured to cause the processor to:

receive, by the processor, input data, wherein the input data includes a plurality of messages, each message containing a set of message data;

generate, by a pattern detector, and based on the input data, a network graph, wherein the network graph includes a plurality of nodes and each node includes a set of characteristics;

determine a first risk indicator for each of the plurality of nodes, wherein the risk indicator based on a first characteristic of the set of characteristics;

assign a first weight to the first risk indicator for each node of the plurality of nodes, wherein the first weight represents a likelihood, for each node, for the first risk indicator to portray fraudulent activity, wherein the first weight being above a first threshold indicates the node is associated with fraudulent activity regarding the first risk indicator;

identify a first hotspot in the plurality of nodes, wherein the first hotspot is based on the first weight of the first risk indicator of a first node; and output, by a network interface, the first hotspot and the network graph, wherein the outputting includes displaying the network graph including highlighting the first hotspot.

15. The system of claim 14, wherein the program instructions are further configured to cause the processor to:

rank, based on page walk, each node of the plurality of nodes; and wherein the identification of the first hotspot further comprises performing a page walk of the network graph.

16. The system of claim 15, wherein the program instructions are further configured to cause the processor to identify at least two co-occurring hotspots, wherein the at least two co-occurring hotspots include the first hotspot and a second hotspot and the identification of the first hotspot and the second hotspot is based on the ranking of the first hotspot and a second hotspot.

17. A computer program product, the computer program product comprising a tangible computer readable storage medium having program instructions embodied therewith, the program instructions executable by a processing unit to cause the processing unit to: receive, by a processor, input data, wherein the input data includes a plurality of messages, each message containing a set of message data; generate, by a pattern detector, and based on the input data, a network graph, wherein the network graph includes a plurality of nodes and each node includes a set of characteristics; determine a first risk indicator for each of the plurality of nodes, wherein the risk indicator based on a first characteristic of the set of characteristics; assign a first weight to the first risk indicator for each node of the plurality of nodes, wherein the first weight being above a first threshold indicates the node is associated with fraudulent activity regarding the first risk indicator; identify at least two co-occurring hotspots, wherein the at least two co-occurring hotspots include a first hotspot in the plurality of nodes and a second hotspot, and the first hotspot is based on the first weight of the first risk indicator of a first node; and output, by a network interface, the first hotspot confidence score and the network graph, wherein the outputting includes displaying the network graph including highlighting the first hotspot.

18. The computer program product of claim 17, wherein the program instructions are further configured to cause the processing unit to:

rank, based on page walk, each node of the plurality of nodes; and wherein the identification of the first hotspot further comprises performing a page walk of the network graph.

19. The computer program product of claim 18, wherein the program instructions are further configured to cause the processing unit to:

identify at least two co-occurring hotspots, wherein the at least two co-occurring hotspots include the first hotspot and a second hotspot and the identification of the first hotspot and the second hotspot is based on the ranking of the first hotspot and a second hotspot.

\* \* \* \* \*